(12) United States Patent
Coots

(10) Patent No.: US 11,572,660 B2
(45) Date of Patent: Feb. 7, 2023

(54) TIE PLATE ORIENTATION DEVICE

(71) Applicant: B & B Metals, Inc., Shepherdsville, KY (US)

(72) Inventor: Coty T. Coots, Shepherdsville, KY (US)

(73) Assignee: B&B Metals, Inc., Shepherdsville, KY (US)

( * ) Notice: Subject to any disclaimer, the term of this patent is extended or adjusted under 35 U.S.C. 154(b) by 0 days.

(21) Appl. No.: 17/486,074

(22) Filed: Sep. 27, 2021

(65) Prior Publication Data

US 2022/0010499 A1    Jan. 13, 2022

Related U.S. Application Data

(63) Continuation of application No. 16/910,913, filed on Jun. 24, 2020, now Pat. No. 11,136,726.

(51) Int. Cl.
| | |
|---|---|
| *B65G 47/244* | (2006.01) |
| *E01B 29/32* | (2006.01) |
| *E01B 29/24* | (2006.01) |

(52) U.S. Cl.
CPC ............ *E01B 29/32* (2013.01); *B65G 47/244* (2013.01); *E01B 29/24* (2013.01); *B65G 2201/02* (2013.01)

(58) Field of Classification Search
CPC ... B65G 2201/02; B65G 47/244; E01B 29/24; E01B 29/32
See application file for complete search history.

(56) References Cited

U.S. PATENT DOCUMENTS

| | | | |
|---|---|---|---|
| 4,225,429 A | 9/1980 | Holley | |
| 5,333,719 A | 8/1994 | Piazza | |
| 6,508,351 B1 | 1/2003 | Christoffersen et al. | |
| 8,042,473 B2 | 10/2011 | Buckley et al. | |
| 9,138,781 B1 * | 9/2015 | Strong | A22C 17/002 |
| 11,136,726 B1 | 10/2021 | Coots | |
| 2020/0131714 A1 | 4/2020 | Sperling et al. | |

FOREIGN PATENT DOCUMENTS

| | | | | |
|---|---|---|---|---|
| CA | 3112253 A1 | * | 9/2021 | ............. E01B 29/32 |
| CA | 3122444 A1 | | 12/2021 | |
| CN | 104797512 A | * | 7/2015 | ............. B65G 37/00 |

OTHER PUBLICATIONS

Canadian Patent Application No. 3,122,444 filed on Jun. 15, 2021.

* cited by examiner

*Primary Examiner* — Gene O Crawford
*Assistant Examiner* — Lester Ill Rushin
(74) *Attorney, Agent, or Firm* — Dinsmore & Shohl LLP

(57) ABSTRACT

Present embodiments relate to a tie plate orientation device. More specifically, but without limitation present embodiments relate to a tie plate orientation device that orients tie plates in a desired orientation for subsequent feeding, including an optional handheld magnetic device for manual assisted manipulation of the tie plates.

16 Claims, 10 Drawing Sheets

TIE PLATE ORIENTATION DEVICE

CLAIM TO PRIORITY

This continuation patent application claims priority to and benefit of, under 35 U.S.C. § 120, U.S. patent application Ser. No. 16/910,913, filed Jun. 24, 2020 and titled "Tie Plate Orientation Device", all of which is incorporated by reference herein.

BACKGROUND

1. Field of the Invention

Present embodiments relate to a tie plate orientation device. More specifically, but without limitation present embodiments relate to a tie plate orientation device that orients tie plates in a desired orientation for subsequent feeding, including an optional handheld magnetic device for manual assisted manipulation of the tie plates.

2. Description of the Related Art

In current tie plate distribution systems, sorting and/or separating of tie plates, including orientation of the plates, is a highly manual endeavor. Tie plates should be in the correct orientation (longitudinal vs. lateral) ad should be upside down or right side up, depending on how the tie plate needs to be dispensed. Workers stand along conveyors to lift, rotate and/or orient tie plates for proper feeding location. This typically requires two men on lower output machines and as many as six men on high output or high production machines.

Due to labor costs and a desire to eliminate lifting or other injuries, it would be desirable to automate as many of these labor positions as possible.

Additionally, it would be desirable to increase the throughput of tie plates in automated fashion to increase efficiencies associated with distribution and therefore decrease the downtime of railroad tracks during maintenance periods when tie plate replacement is necessary.

The information included in this Background section of the specification, including any references cited herein and any description or discussion thereof, is included for technical reference purposes only and is not to be regarded subject matter by which the scope of the invention is to be bound.

SUMMARY

The present embodiments provide a tie plate orientation device which is fed a plurality of separated tie plates and which orients the tie plates in a desired manner so that the tie plates can continue feeding to a tie plate dispenser. The tie plate orientation device may pivot the tie plates in a desired manner, about a vertical axis, so that upon subsequent feeding, the tie plates may continue to move in an aligned manner. In some embodiments, a conveyor moves in a direction that is transverse to an adjacent conveyor in order to correctly orient the tie plates before the tie plates fall through a space.

According to some embodiments, a tie plate orientation device may comprise a first conveyor which is selectively operated to advance tie plates sequentially, a second conveyor which receives one of the tie plates at a time from the first conveyor, a third conveyor spaced from the second conveyor, the third conveyor being continually operated and having an operating surface which is transverse to the second conveyor. One of the tie plates moves from the second conveyor and either: (a) falls through a space between the second conveyor and the third conveyor in a first orientation or, (b) engages the third conveyor in a second orientation and rotates the one of the tie plates due to such engagement, so that the one of said tie plates moves to the first orientation and falls through the space.

Some optional features may be utilized with the tie plate dispenser either alone or in combination with other embodiments. Such optional embodiments may include, but are not limited to the following. The first conveyor may have a first operating direction. The second conveyor having a second operating direction. The third conveyor may have a third operating direction which is at an angle to said second operating direction. The operating surface of the third conveyor blocking the second conveyor. The third conveyor may be a belt. The second conveyor may be a belt conveyor. The second conveyor being continually operating. The space having one dimension that is less than a long dimension of the tie plates. The one dimension being at least about one-half a short dimension of the tie plates.

According to some embodiments, a method of orienting a tie plate, comprising the steps of directing, intermittently, the tie plate using a first conveyor, continuing movement of the tie plate using a second continuously operating conveyor, engaging the tie plate with a third conveyor that is oriented transverse to the second continuously operating conveyor, rotating the tie plate by engagement with the second and third conveyors into a desired orientation, and, passing the tie plate to a tie plate distribution system.

According to a further embodiment, a hand held tie plate orientation device comprises a body which is suitable to be handheld, a button which is operably connected to an actuator, a magnet which is disposed within the body and is connected to the actuator, the magnet movable between a first position which it extending from or be even with an edge of the body, and a second position which is retracted within the body, wherein the button may be actuated to either extend the magnet to the first position and pick up a tie plate or retract the magnet and release a tie plate from being held by the magnet.

Some optional features may be utilized with the tie plate dispenser either alone or in combination with other embodiments. Such optional embodiments may include, but are not limited to the following. Optionally, the actuator may be powered by fluid power or by electric power supply. The body may have a connection for the fluid power or the electric power supply. The body may have a passage wherein the magnet can move. When the magnet retracts, a tie plate held by the magnet is engaged by the body and released from the magnet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

In order that the embodiments may be better understood, embodiments of a tie plate orientation device and method will now be described by way of examples. These embodiments are not to limit the scope of the claims as other embodiments of a tie plate orientation device will become apparent to one having ordinary skill in the art upon reading the instant description. Non-limiting examples of the present embodiments are shown in figures wherein:

DETAILED DESCRIPTION

Figure 1:
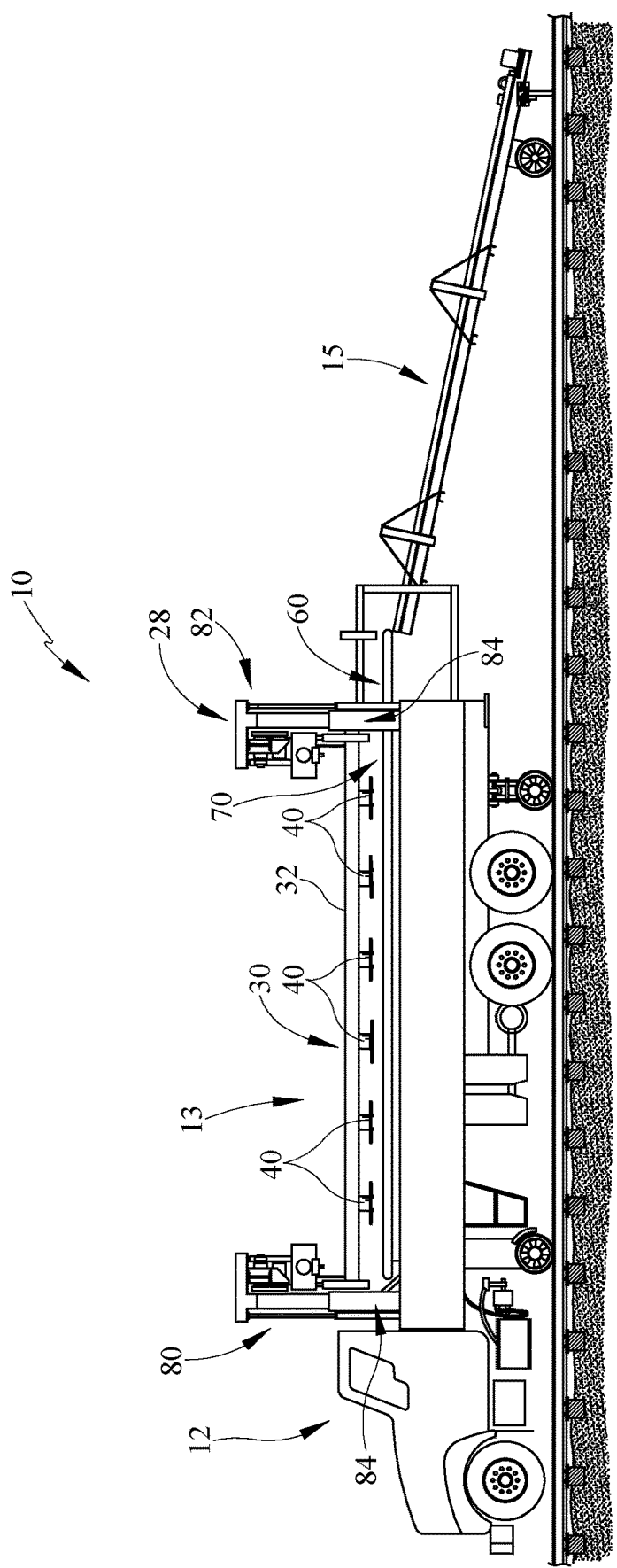
FIG. 1 is a side elevation view of an example tie plate dispensing system.

It is to be understood that the tie plate orientation device is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-10, a tie plate separator and dispensing system is provided which utilizes a tie plate orientation device. The tie plate orientation device orients the separated tie plates for feeding on to the tie plate dispenser. The tie plate orientation device receives unaligned tie plates and rotates them into a desired orientation for further feeding on to the tie plate dispenser.

Referring now to FIG. 1, a side view of an embodiment of the tie plate separator and dispensing system is provided. According to the following embodiments, a magnetic bar 32 of the tie plate separator 30. The separator 30 picks up tie plates from one or more piles and deposits them on a conveyor 70 for further delivery to additional processing devices. It should be noted that the term "conveyor" is utilized and is illustrative and not limiting of a traditional belt or roller conveyor but may be various forms of mover devices. For example, the term conveyors may be but is not limited to, roller conveyors, chutes, gravity feeders, vibratory feeders, or any other device or mechanism capable of conveying the tie plates from a first position to a second position. The conveyors may be indicative of a powered conveyor, a non-powered conveyor, or a combination. The conveyor 70 may be a powered conveyor as will be described further in order to intermittently power on and power off the operation and feed to an orientation device 60. Additionally, for purpose of understanding, the term "longitudinal" refers to the long dimension of the conveyor and the term "lateral" or "latitudinal" refers to width dimension of the conveyor. In the instant description, the conveyor 70 is shown with a longitudinal direction which is aligned with the forward-rearward direction of the vehicle 12 and the direction of the railroad track.

The bar 32 with magnets is supported at ends by a crane, in this embodiment a gantry crane 28, for upward and downward movement as well as lateral movement relative to the rail vehicle 12. The term lateral, which is merely description and should not be considered limiting, should be understood to be direction depicted in bold arrows of FIG. 2. However, the lateral direction may change if the orientation of the gantry crane 28 is changed on the rail vehicle 12. The tie plate separator system 10 and specifically the rail vehicle 12 may comprise a bed area 13 which includes at least one storage compartment 50, 52 (FIG. 2) with tie plates and the conveyor 70 that receives and delivers tie plates 16 to the tie plate distribution, or dispenser, system 15. The tie plate conveyor 70 may be located along the center line of the bed 13 of the hi-rail vehicle 12, or may be offset to one side. In some embodiments, the conveyor 70 may be located generally along the center of the vehicle 12 longitudinal axis and at least one storage compartment 50 (FIG. 2) on at least side of the conveyor 70 also extending in the longitudinal direction of the hi-rail vehicle 12.

The vehicle 12 is depicted as a self-propelled vehicle and comprises and engine or motor to propel the vehicle along the railroad track and for on-road usage. In the instant figure, the vehicle 12 is depicted as a hi-rail vehicle. However, other vehicles may be utilized as will be discussed further herein.

Also disposed in the bed of the vehicle 12 is the tie plate separator 30 which is generally defined by the bar 32 which is moveable by the gantry crane 28. The gantry crane 28 comprises first and second support structures 80, 82. In the instant embodiment, the first support structure 80 is a forward structure and the second support structure 82 is a rear structure relative to the longitudinal direction of the vehicle 12. Each of the support structures 80, 82 are generally n-shaped, when viewed from a rear of the vehicle, having two upright supports and an elevated cross-member.

Figure 2:
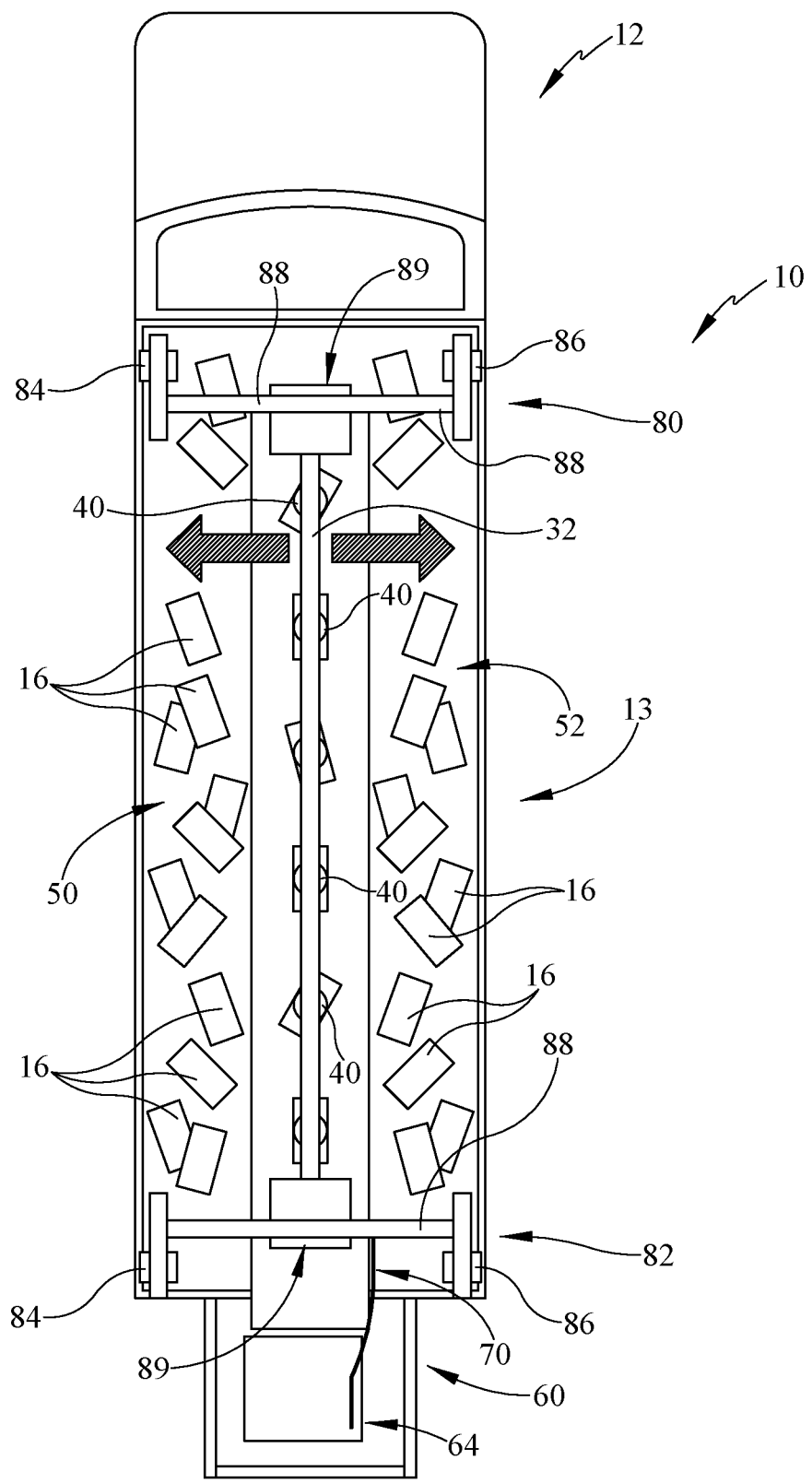
FIG. 2 is a top view of the tie plate dispensing system of FIG. 1.

Referring now to FIG. 2, a top view of the tie plate separator system 10 is shown on the hi-rail vehicle 12. The tie plate separator system 10 includes the first support structure 80 and the second support structure 82 at forward and rearward respective ends of the vehicle bed 13. Each support structure 80, 82 may comprise two columns 84, 86 and a cross-member 88.

Disposed on the cross member 88 is a trolley 89 which moves laterally, from side to side, relative to the vehicle 12 longitudinal direction along the cross-member 88. The movement of the trolley 89 on the cross member 88 allows for movement of the bar 32 between the columns 84, 86. The movement of the trolley 89 causes movement of the tie plate separator 30, and specifically the bar 32.

Shown on either side of the bar 32 are tie plate storage compartments 50, 52. The storage compartments 50, 52 allow for placement and storage of tie plates 16 which are to be picked up by the bar 32 and deposited on the conveyor 70 for further movement on to the tie plate distribution system 15 (FIG. 1).

In function, the trolleys 89 move between the vertically extended columns 84, 86 along cross-member 88 to allow the bar 32 to move over the two storage compartments 50, 52. The bar 32 may then be lowered to pick up a plurality of tie plates 16 located in either of the storage compartments 50, 52 and the bar 32 is returned to the center of the vehicle 12 over the conveyor 70. Once positioned over the conveyor 70, the bar 32 is lowered or the magnetic field is cut to drop the tie plates 16 from the storage compartments 50, 52 onto the conveyor 70. Once deposited, the tie plates 16 are separated as previously described via the function of the separator 30 and magnets 40 (FIG. 1).

In order to raise and the lower the bar 32, two embodiments of the lifting functionality are provided. According to one embodiment, the trolley 89 may also comprise a hoist or winch which comprises cables which lift and lower the separator 30. The cables may depend from the hoist and extend or retract therefrom to vary the height of each end of the separator 30. In other embodiments, the support structures 80, 82 may lift and lower the separator 30. For example, and with further reference to FIG. 1, the support structures 80, 82 may comprise a lower collar or sleeve and an arm which extends therefrom and may move telescopically into or out of the lower collar or sleeve. As a result, the height of the support structures 80, 82 may vary and a fixed connection of the bar 32 may therefore lift or lower the bar 32. In other embodiments, a combination of movable support structures 80, 82 and the trolley 89 with hoist or winch may be utilized. Other structures may also be utilized to raise and lower the separator 30.

Figure 3:
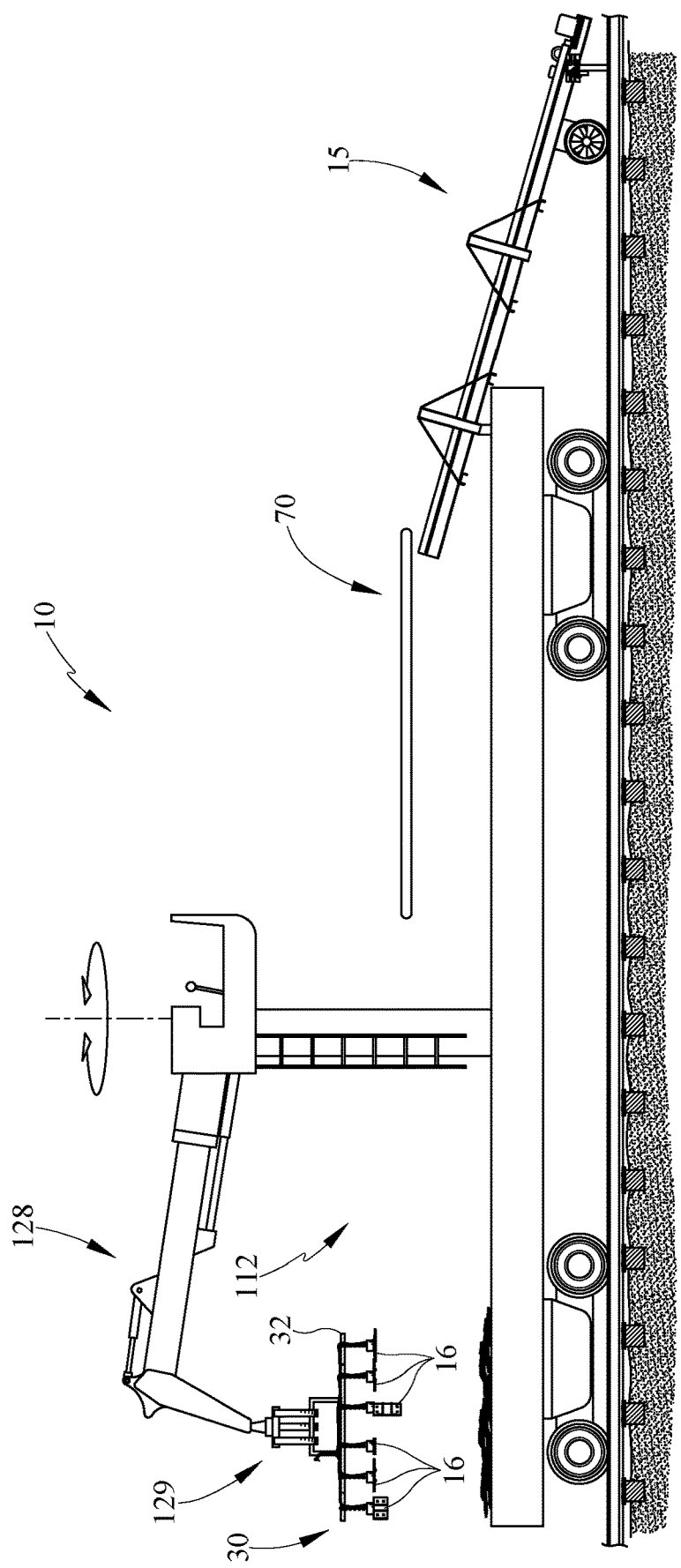
FIG. 3 is side view of an alternate embodiment of a tie plate separator for a flat-bed railcar.

The embodiment of FIG. 3 also includes the conveyor 70 which receives the separated tie plate 16 and feeds them to the tie plate distribution system or dispensing system 15. According to an embodiment of FIG. 3, an alternate separator system 10 is provided. In this embodiment, the gantry crane is replaced with a cantilevered crane 128 with a grappler 129. The separator 30 is a magnetic bar 32 at the end of the crane 128.

As a further depicted optional embodiment, the hi-rail truck may be replaced by a towable flat-bed rail car 112. In this embodiment, any of various embodiments may be used—gantry crane, cantilevered crane, or other.

Figure 4:
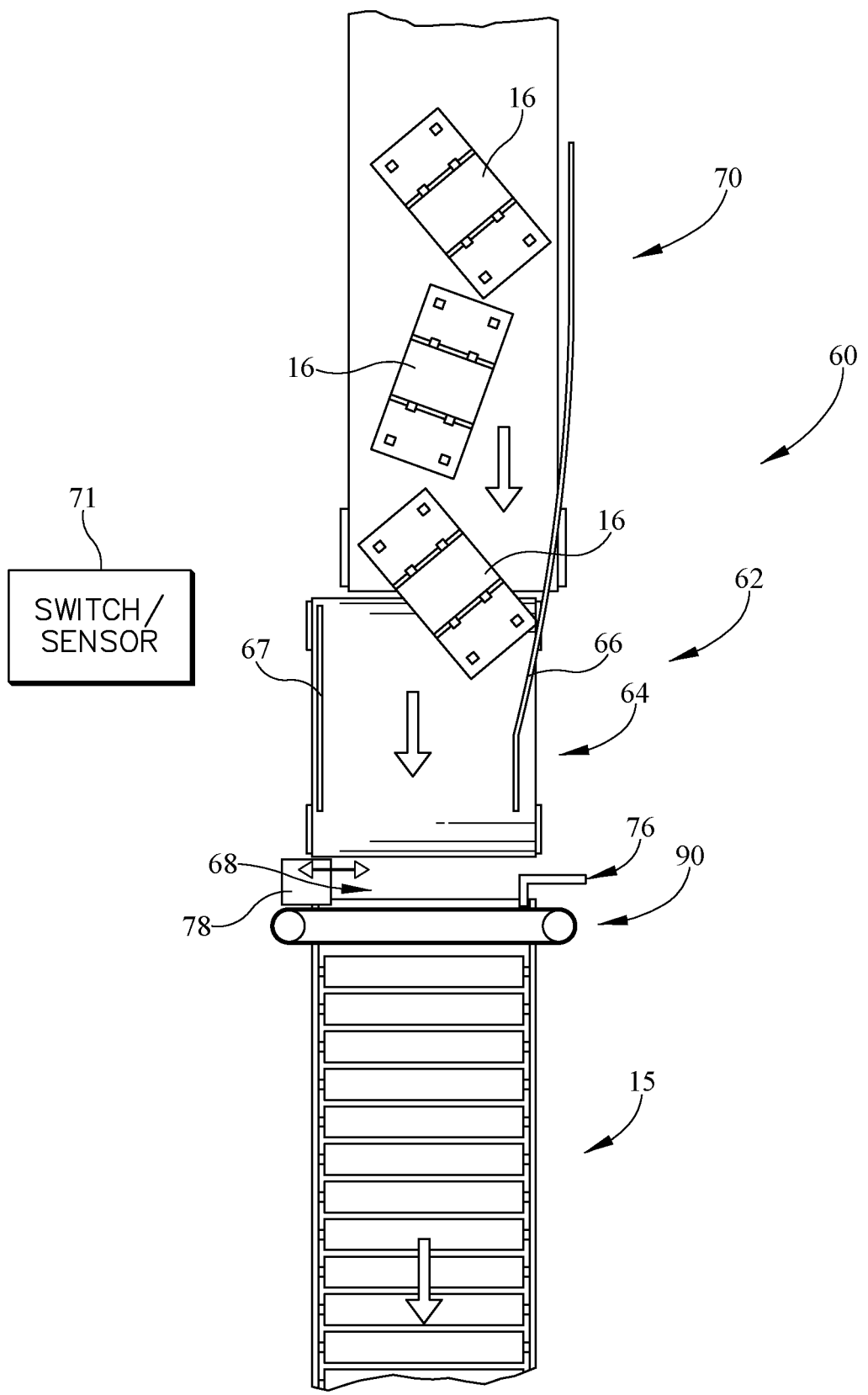
FIG. 4 is a first top sequence view of a tie plate orientation device.

Referring now to FIG. 4, a top view of a tie plate orientation device 60 (FIG. 1 also) wherein the transition area 62 is defined which feeds tie plates from the separator system 10 to the distribution system 15. More specifically, the conveyor 70 feeds to a second conveyor 64, which subsequently feeds the dispenser system 15. The orientation device 60 aligns the tie plates 16 in such a way as to feed the tie plates in a consistent and desired orientation to the dispenser system 15.

In the instant embodiment, the conveyor 70 is shown with a plurality of tie plates 16 thereon and with the tie plates separated but disposed in a misaligned or disorganized fashion. The conveyor 70 will be described as the first conveyor merely for ease of description and distinction from the other conveyors but should not be considered limiting. This is merely descriptive. The first conveyor may function intermittently, that is, in some embodiments the first conveyor does not continuously run, but instead turns only to feed on tie plate 16 at a time (singularly) to a second conveyor 64 within the transition area 62. The second conveyor 64 is again described as second merely for ease of description and clarity. The term second should not be considered limiting.

The first conveyor 70 may have a first operating direction and the second conveyor may have a second operating direction. The first and second operating directions may be the same direction as shown, or may be differing directions.

A third conveyor 90 is also shown oriented transversely to the second conveyor 64. The conveyor 90, for example, moves about rollers which are oriented vertically, rather than the substantially horizontal rollers of the first and second conveyors 70, 64. The conveyor 90 therefore has a surface which is therefore also generally vertical and moves horizontally across the path of the second conveyor 64.

Referring again to the first conveyor 70, the conveyor operates selectively to position one tie plate 16 at a time on the second conveyor 64. This may be done by manual operation, for example by an operator with a switch operated by an operator on the system 10, or with a sensor that monitors when a tie plate 16 is on the second conveyor 64 or is located between the first and second conveyors 70, 64. The sensor may be defined by any of, or a combination of: analog distance sensor, one or more proximity sensors, or one or more limit switches. Accordingly, the first conveyor 70 may intermittently start and stop to position tie plates 16 one at a time on the second conveyor 64. The switch or sensor 71 is shown schematically in FIG. 4.

As shown, one tie plate 16 is exiting the first conveyor 70 and starting to be engaged by the second conveyor 64. The second conveyor 64 is continuously turning. At this point, the first conveyor 70 may stop and the second conveyor 64 causes movement of the tie plate 16. Thus, the single tie plate is engaged by the second conveyor 64 and pulled on to the second conveyor 64 by the continuous operation of the second conveyor 64.

Figure 5:
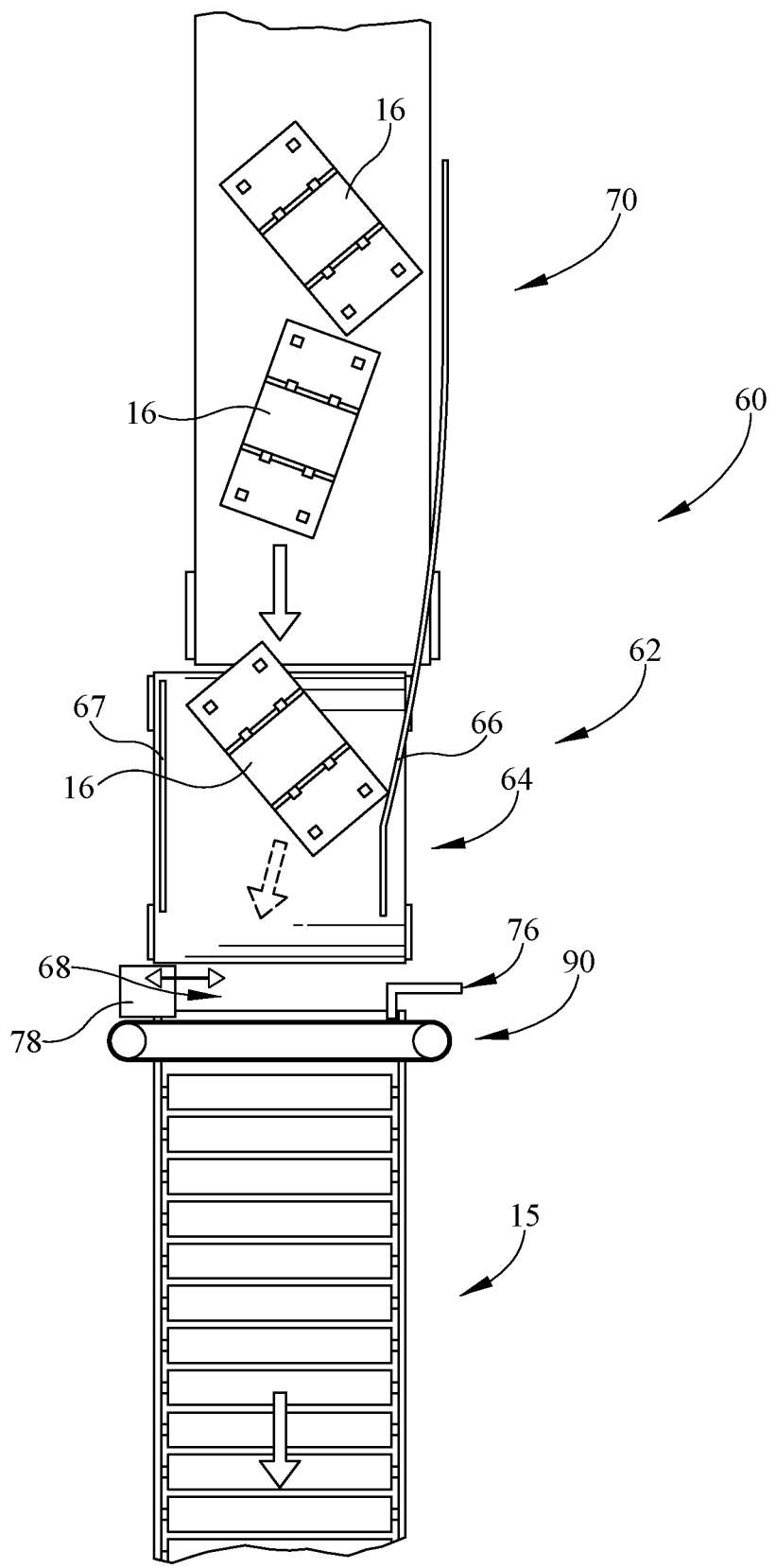
FIG. 5 is a second top sequence view of the tie plate orientation device.

With reference to FIG. 5, the tie plate 16 on the second conveyor 64 is shown engaging a guide wall 66. The guide wall 66 directs the path of travel of the tie plate 16 for tie plates that are located on the guide wall side of the second conveyor 64. A broken arrow indicates an intended path of travel for the tie plate 16 once it is guided by the guide wall 66. Alternatively, if a tie plate 16 is on the opposite side of the conveyor 64, away from the guide wall 66, it will not be engaged. The guide wall 66 directs the tie plate 16 opposite the direction of travel of the third conveyor 90.

An optional opposite wall 67 may be located opposite the guide wall 66. The opposite wall 67 may preclude tie plates 16 from falling from the second conveyor 64 along an opposite side of the conveyor 64. Further, however, there is a relationship between the third conveyor 90 and the opposite wall 67. As shown in FIG. 5, the tie plate 16 may be angled when engaging and exiting the guide wall 66. The distance between the guide wall 66 and the opposite wall should at least be a diagonal dimension of an exemplary tie plate being fed. This opposite wall 67 may therefore be fixed at a maximum distance for the anticipated tie plate sizes to be used, or may be adjustable relative to the center of the conveyor 64, so that the dimension may be varied for varying tie plate sizes. In some embodiments, the diagonal dimension of the tie plates 16 may be about 20 inches, and therefore the minimal dimension between the guide wall 66 and the opposite wall 67 may be about 20 inches. However, this is merely one example and tie plate sizes and therefore structural dimensions may vary.

Still further, the third conveyor 90 may be sized to extend outwardly in a lateral direction a distance greater than the wall 67. Accordingly, any tie plate 16 that is spaced from the guide wall 66 and engaging the opposite wall 67, the tie plates 16 are forced to engage the belt conveyor 90. Otherwise stated, the tie plates cannot miss engagement with the belt conveyor 90.

As shown in the view, the inward (toward the center of the conveyor 64) position or the end of guide wall 66, is offset from the inward-most surface of the alignment device 76. In other words, the guide wall 66 is further inward than the alignment device 76. The amount of offset may vary but in some embodiments is greater than ¾ inch and in some other embodiments is at least one (1) inch. This serves at least two functions. First, the tie plates 16 are directed further inwardly than the position of the alignment device 76. Second, from this more inward position, the tie plate 16 can rotate and clear the alignment device 76 as it rotates, for example the tie plate can clear the corner of the alignment device 76.

Figure 6:
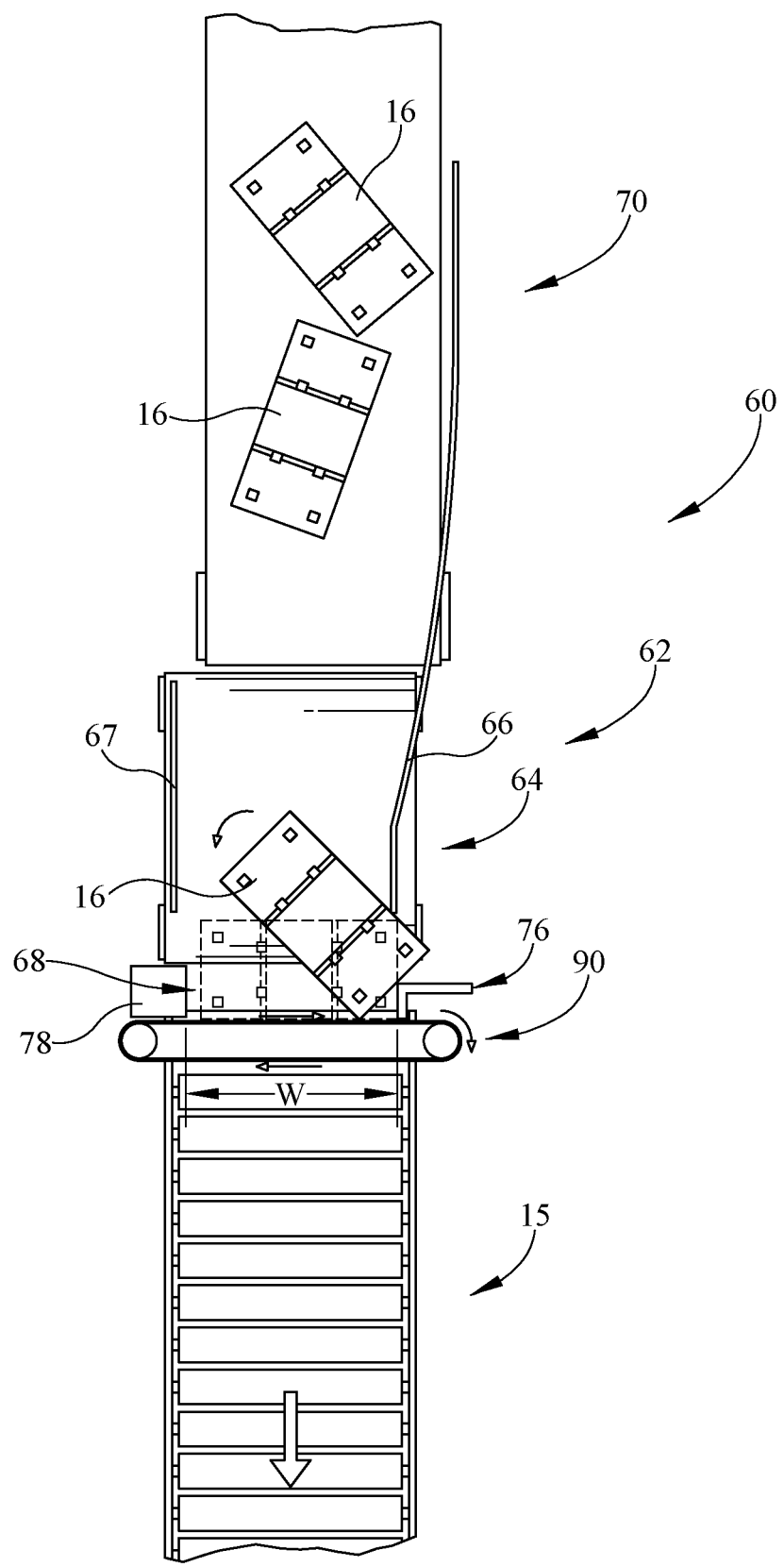
FIG. 6 is a third top sequence view of the tie plate orientation device.

With reference to FIG. 6, the tie plate 16 of the second conveyor 64 is advanced toward and engaged by the third conveyor 90. With the tie plate 16 moved into engagement with the third conveyor 90, the tie plate 16 is pivoted or rotated about a vertical axis. As the tie plate 16 rotates, a corner of the tie plate 16 clears an alignment structure 76 which engages an edge of each tie plate 16 and stops lateral movement induced by movement of the third conveyor 90.

Once the corner 16a of the tie plate 16 clears the alignment device 76, an edge of the tie plate 16 may engage the end of guide wall 66. This end of the guide wall 66 then acts as a stop and a pivot so that the tie plate 16 can continue to pivot and due to the driving force of belt conveyor 90. In order to provide appropriate clearance for this movement of the tie plate 16, the distance between end of the guide wall 66 and belt conveyor 90 should be sized to be at least the size of the short dimension of the tie plate 16. For example, this may be about 7¾ inches, in some examples. However, this dimension may vary and therefore the dimension is not to be considered limiting.

In this view, the third conveyor 90 is moving the tie plate 16 to the left. Additionally, the second conveyor 64 is moving the tie plate 16 into the third conveyor 90. Once the rotation of the tie plate 16 stops, the short edge of the tie plate 16 is against the alignment structure 76 and the long edge is parallel to the third conveyor 90 surface, as shown in broken line.

With reference still to FIG. 6, a space is provided between the second conveyor 64 and the conveyor of the distribution system 15. As a result, when the tie plate 16 is oriented such that the minor axis of the tie plate 16 is parallel to the longitudinal axis of the second conveyor 64, the space 68 is sized to allow tie plate 16 to fall through the space 68 and on to the distribution system 15.

Figure 7:
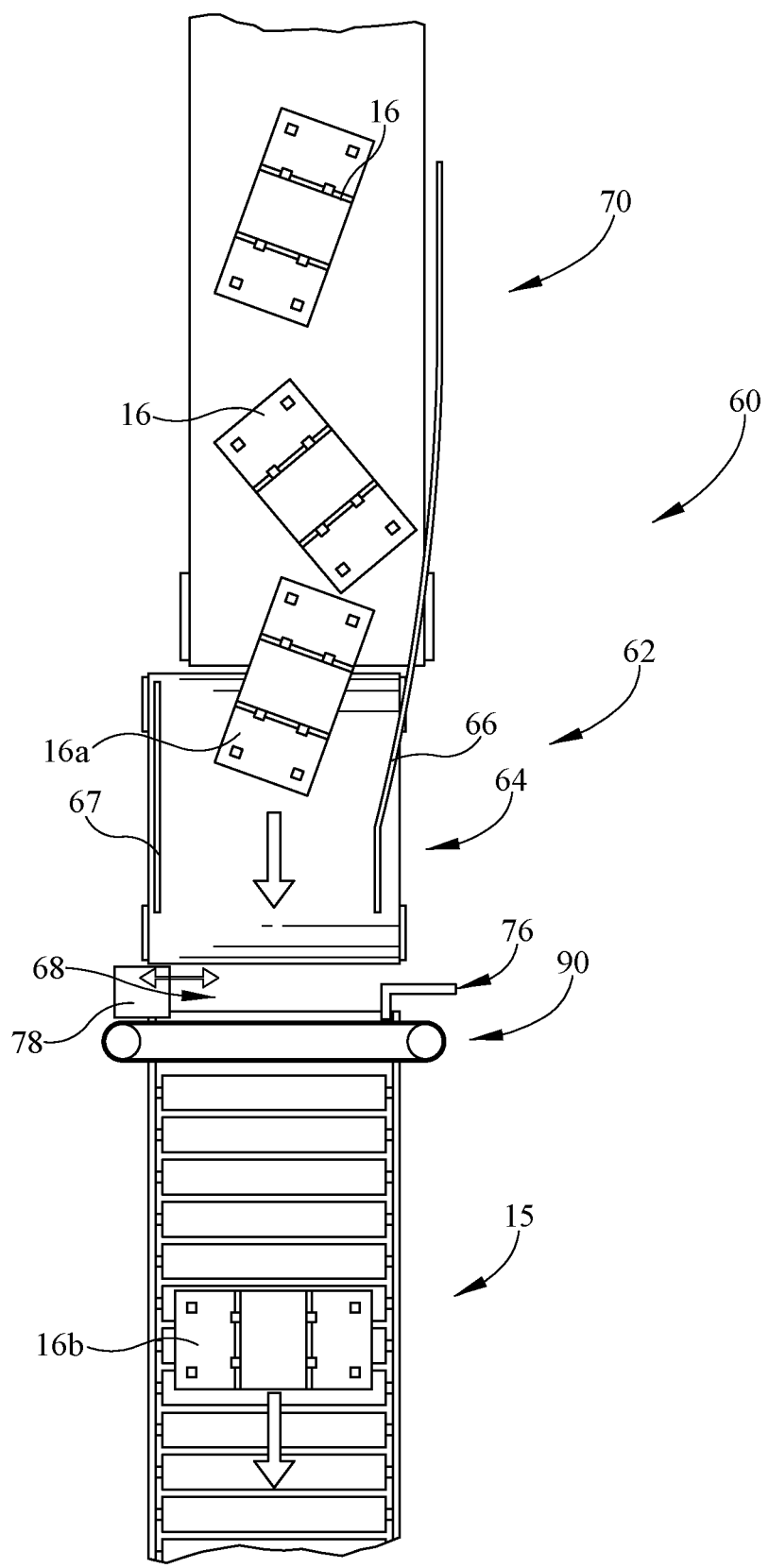
FIG. 7 is a fourth top sequence view of the tie plate orientation device.

Once the tie plate 16 falls through the space 68 and on to the conveyor of dispenser system 15, the first conveyor 70 may be activated to send a subsequent tie plate 16 on to the second conveyor 64. As shown in FIG. 7, a subsequent tie plate 16b is shown on the second conveyor 64 and the previously described tie plate 16 is shown moving on a conveyor of the tie plate distribution system 15.

Referring again to FIG. 6, the orientation device 60 also comprises a guide 78 across from the alignment device 76, in the lateral direction. The guide 78 may be adjustable so that the dimension (W) between the alignment device 76 and the guide 78 is adjustable. Accordingly, the dimension can be adjusted and sized to receive the tie plates of differing sizes therebetween. With this adjustability, the tie plate 16 may be located between the alignment device 76 and the guide 78, so that it is positioned for the fall through the space 68 on to the tie plate distribution system 15.

Figure 8:
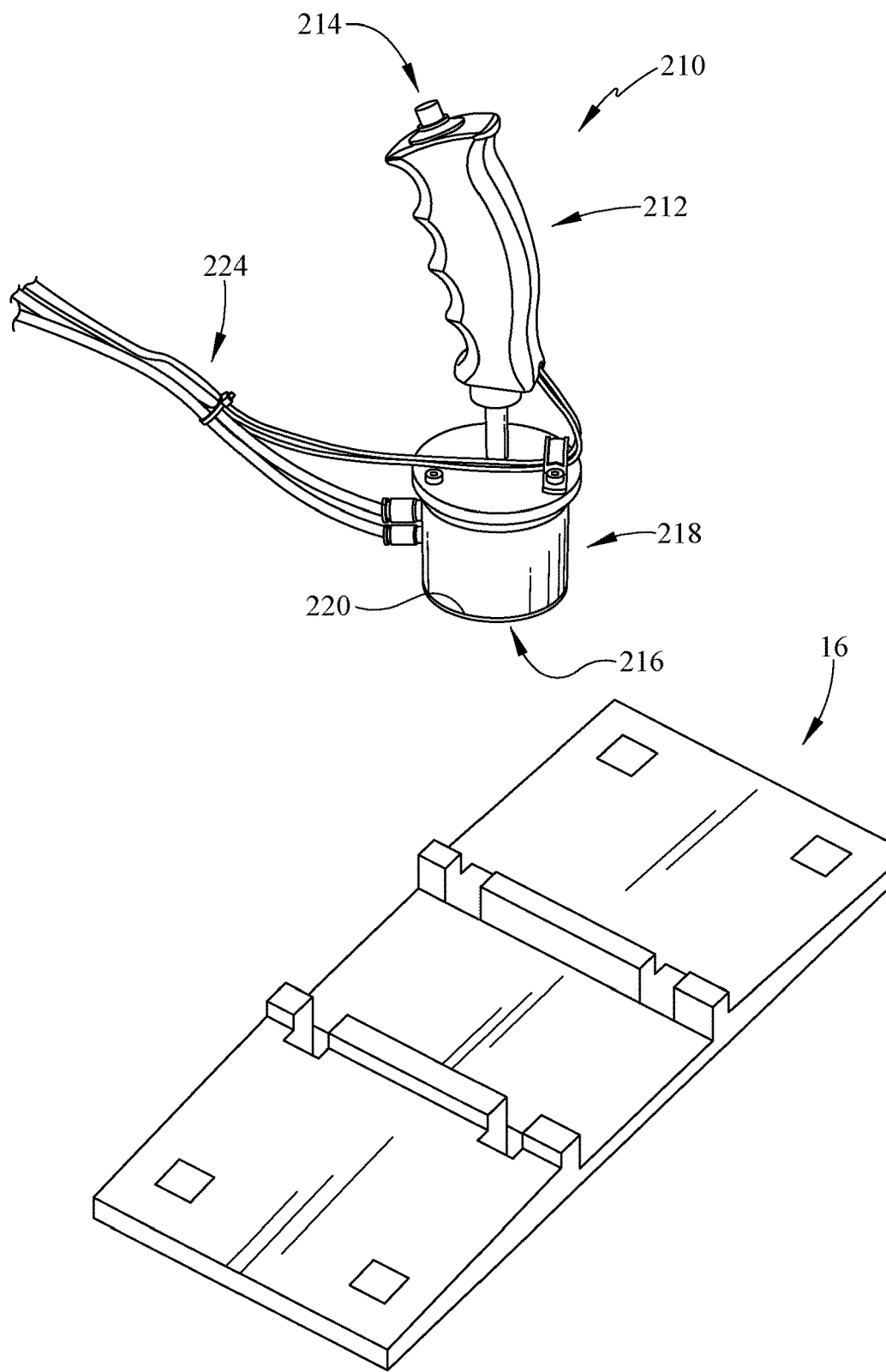
FIG. 8 is a perspective view of a handheld tie plate orientation device.

Referring now to FIG. 8, a handheld tie plate orientation device 210 is shown. The handheld device 210 may be used to re-orient tie plates on conveyor 70 (FIGS. 1-3), or conveyor 64 in the transition area 62. The handheld device 210 has a handle portion 212 which may be gripped by a user. The handle portion 212 may also comprise a button or switch 214 which may be used to actuate use of the handheld device 210 and engage or magnetically retain the tie plate 16. The switch or button 214 may be biased to a normal position and movable to a second position, for example. In other embodiments, the button or switch 214 may be used to disengage the tie plate 16. Thus the button 214 may be used to engage the tie plate 16 or the button 214 may be used to disengage the tie plate 16, either of which may depend on what the normal position of the magnet 216 is. The magnet 216 may be a permanent magnet which is moved by an actuator or may be an electromagnet which is powered on and off to retain and release the tie plate 16.

Connected to the handheld device 210 is a magnet 216 and actuator 218. The magnet 216 may be located within the outer housing of the actuator 218. The actuator 218 may move the magnet 216 from a first position to a second position. In one of the first and second positions, the magnet 216 may be flush with a lower edge 220 or may extend beyond the edge 220 as shown in broken line. In the other of the first and second positions, the magnet 216 may be retracted beyond the lower edge 220. The magnet 216, in its extended position, can magnetically engage a tie plate 16 so that a user can lift the tie plate 16 and rotate or flip the side, for example if the tie plate is upside down.

The actuator 218 may be powered electrically or may be powered by fluid connection. The handheld device 210 is shown with conduits 224 for fluid or electric power. When the actuator 218 receives a signal via fluid or electric power, the actuator moves the magnet 216 through the housing or body of the actuator 218.

Figure 9:
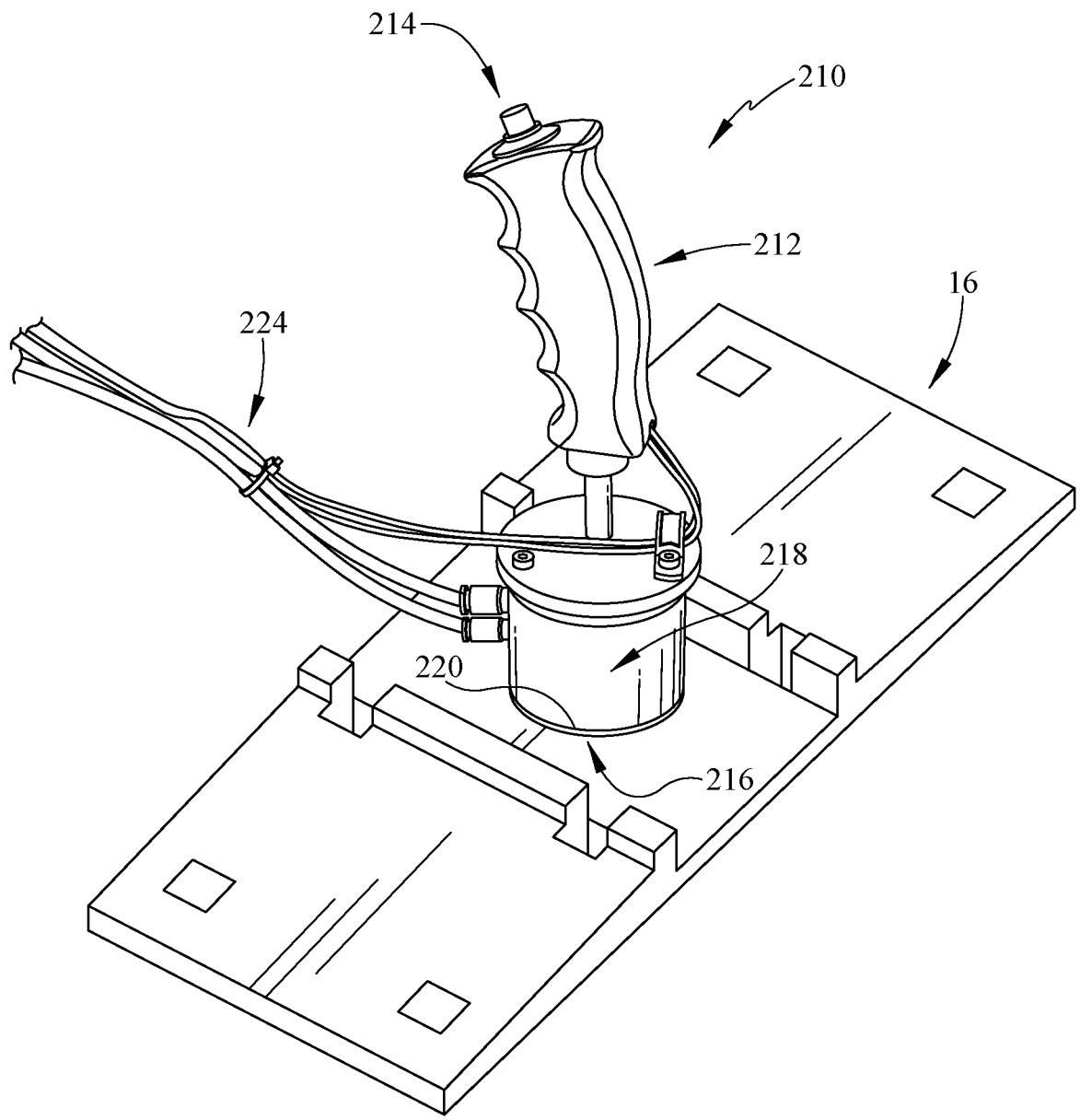
FIG. 9 is the handheld tie plate orientation device of FIG. 8 shown magnetically engaging a tie plate; and, FIG. 10 is a method flow chart.

As shown in FIG. 9, the handheld device 210 is shown magnetically engaging a tie plate 16. With the tie plate 16 engaged, the tie plate may be rotated and released in a desired orientation on a conveyor without the danger of pinching a finger or dropping the tie plate on a finger or limb. Once the tie plate 16 is oriented in a desired fashion, the button may be depressed or the button 214 may be released to release the tie plate 16 on to a conveyor.

Figure 10:
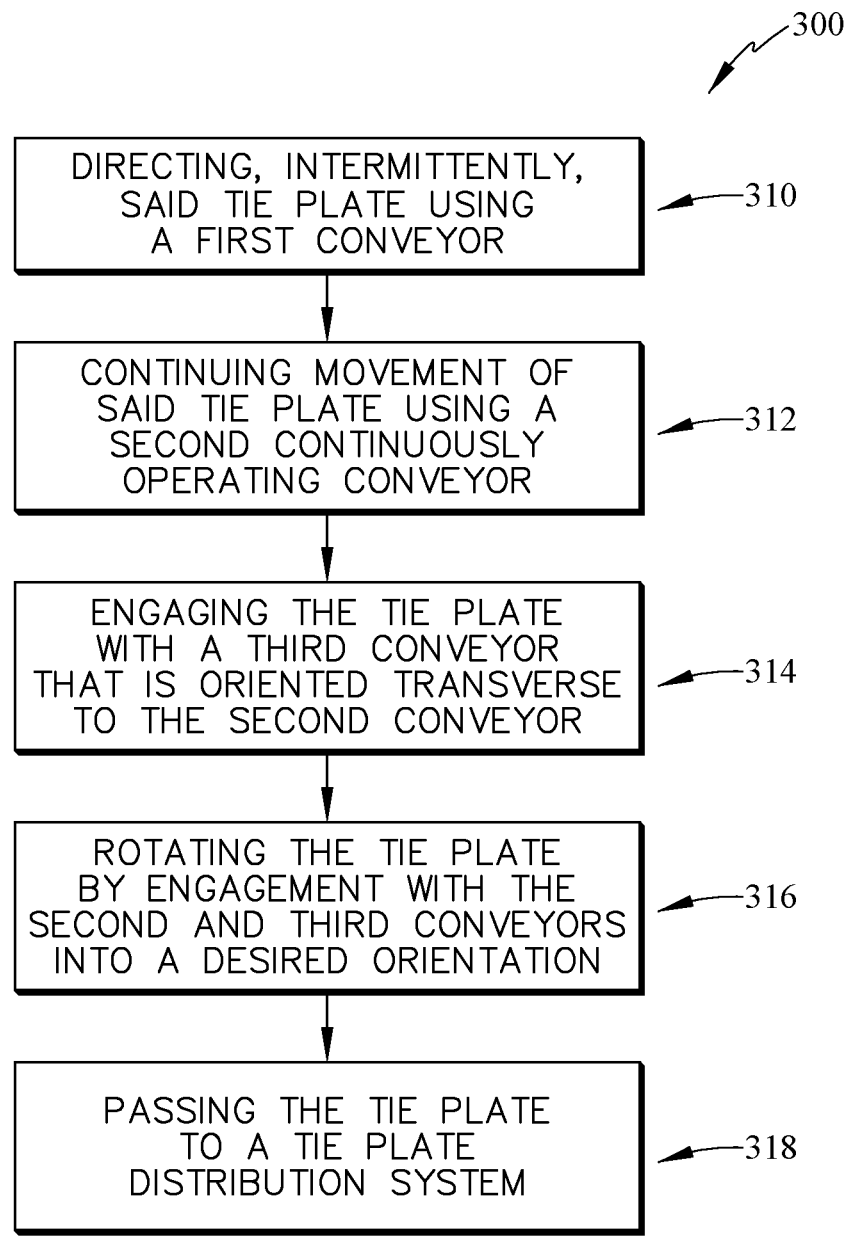

Referring now to FIG. 10, a flow chart of method 300 is provided which shows an example method of use. The method may vary such that the instant flow chart is not the sole method of use and variations should be considered within the scope of use.

According to a first step 310 of the method 300, a tie plate is directed using a first conveyor 70. As described, this first conveyor 70 may function intermittently to feed tie plates 16 one at a time to the second tie plate.

In a second step 312, the tie plate 16 is moved by the continuously operating belt conveyor 64. This continuous operation is as opposed to the intermittent operation of the first belt conveyor 70.

According to a next step 314, the tie plate 16 engages the third belt conveyor 90 that is transverse to the second belt conveyor 64. The third belt conveyor 90 may also be continuously operating as is the second belt conveyor 64.

Next, in step 316, the tie plate 16 is rotated by engagement with the second and third belts in a desired orientation. This orientation may also be located at a specific location. Once the tie plate 16 is located at the desired position and in the desired orientation, the tie plate 16 passes through the space 68 to the tie plate distribution system 15, at step 318. This may be by actuation or by gravity and sizing of the space 68.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A tie plate orientation device, comprising:
a conveyor which receives tie plates sequentially;
a transverse conveyor spaced from said conveyor, said conveyor directing said tie plates toward said transverse conveyor;
a space disposed between an end of said conveyor and said transverse conveyor;
wherein each of said tie plates: falls through said space if in a first orientation, or engages said transverse conveyor if in a second orientation so that said each of said tie plates rotates to said first orientation.

2. The tie plate orientation device of claim 1, said conveyor operating in a first direction toward said transverse conveyor.

3. The tie plate orientation device of claim 2, said transverse conveyor having a surface that is perpendicular to said conveyor.

4. The tie plate orientation device of claim 3, said transverse conveyor moving in a direction perpendicular to the first direction.

5. The tie plate orientation device of claim 1, said space having a dimension that is less than a long dimension of said each of said tie plates.

6. The tie plate orientation device of claim 5, said dimension being at least about one-half a short dimension of said each of said tie plates.

7. The tie plate orientation device of claim 6, wherein said each of said tie plates will fall into said space when in said first orientation.

8. The tie plate orientation device of claim 1, said conveyor operating one of continuously or intermittently.

9. The tie plate orientation device of claim 1, said transverse conveyor operating one of continuously or intermittently.

10. The tie plate orientation device of claim 1, further comprising an additional conveyor which feeds said tie plates to said conveyor.

11. A method of orienting a tie plate, comprising the steps of:
providing a tie plate conveyor;
providing a transverse tie plate conveyor near an end of said tie plate conveyor, said transverse tie plate conveyor moving in a direction substantially perpendicular to said tie plate conveyor;
moving said tie plate with said tie plate conveyor;
engaging said tie plate with said transverse tie plate conveyor; and,
changing the orientation of said tie plate with said transverse tie plate conveyor.

12. The method of claim 11, further comprising a continuously operating one or both of said tie plate conveyor and said transverse tie plate conveyor.

13. The method of claim 11, dropping said tie plate through a space.

14. The method of claim 13, orienting said tie plate in order to drop through said space.

15. The method of claim 11, said orienting causing said tie plate to rotate into a position for an additional movement.

16. The method of claim 11, feeding said tie plate to said tie plate conveyor with an additional conveyor.

* * * * *